United States Patent [19]

Theis

[11] Patent Number: 5,301,996
[45] Date of Patent: Apr. 12, 1994

[54] METHOD AND APPARATUS FOR DIRECTING A STREAM OF PRESSURIZED FLUID AT A LOCATION FORWARD OF A WHEEL TO IMPROVE THE TRACTION OF THE SAME

[76] Inventor: Peter F. Theis, 3203 Bay View La., McHenry, Ill. 60050

[21] Appl. No.: 209

[22] Filed: Jan. 4, 1993

[51] Int. Cl.⁵ ............................................... B60J 9/00
[52] U.S. Cl. .................................. 296/180.1; 180/903
[58] Field of Search ................. 296/180.1; 180/89.2, 180/903; 152/214, 208, 153

[56] References Cited

U.S. PATENT DOCUMENTS

| | | | |
|---|---|---|---|
| 1,159,894 | 11/1915 | Byrnes | 152/153 |
| 3,910,623 | 10/1975 | McKeen | 296/180.1 X |
| 4,324,307 | 4/1982 | Schittino et al. | 180/89.2 X |
| 4,673,206 | 6/1987 | Kretschmer et al. | 296/180.1 |

FOREIGN PATENT DOCUMENTS

| | | | |
|---|---|---|---|
| 3102648 | 2/1983 | Fed. Rep. of Germany | 180/89.2 |
| 3245410 | 6/1984 | Fed. Rep. of Germany | 296/180.1 |
| 2570333 | 3/1986 | France | 152/208 |
| 310179 | 12/1990 | Japan | 296/180.1 |

*Primary Examiner*—Dennis H. Pedder
*Assistant Examiner*—Gary C. Hoge
*Attorney, Agent, or Firm*—Blakely, Sokoloff, Taylor & Zafman

[57] ABSTRACT

Apparatus and method for reducing the air pressure ahead of the contact patch of a rotating wheel by directing an air jet substantially at right angles or forwardly of right angle to the plane of the wheel to increase, improve traction and the heating characteristics. In an embodiment the air is heated so as to further improve the traction and other characteristics.

18 Claims, 3 Drawing Sheets

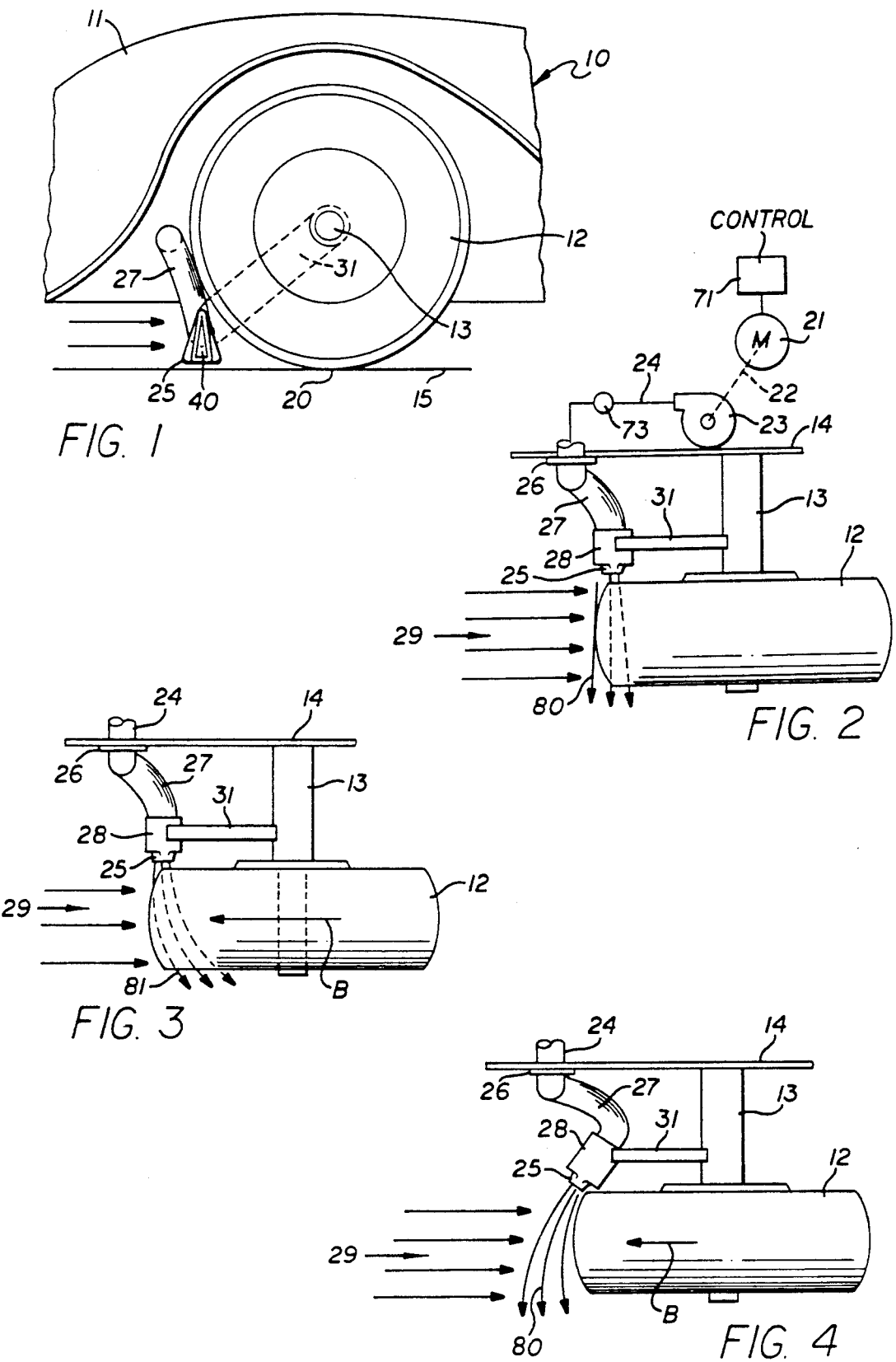

METHOD AND APPARATUS FOR DIRECTING A STREAM OF PRESSURIZED FLUID AT A LOCATION FORWARD OF A WHEEL TO IMPROVE THE TRACTION OF THE SAME

CROSS-REFERENCES TO RELATED APPLICATIONS

This application is related to co-pending application entitled "Wheel Skirt" Ser. No. 07/918,130, filed Jul. 23, 1992 which is a continuation of Ser. No. 07/725,346, filed Jul. 3, 1991 and the disclosure incorporated therein is hereby incorporated by reference.

BACKGROUND OF THE INVENTION

1. Field of the Invention

This invention relates in general to devices and apparatus for improving the air flow around the wheel.

2. Description of Related Art

As wheels of vehicles rotate, the air dynamics associated with rotating wheels becomes increasingly important. When the vehicle is moving at relatively high speeds, the oncoming air can create a number of problems as it strikes the wheel. For example, the air striking a lower portion of the wheel tends to be compressed immediately in front of the contact patch between the wheel and the roadway and to lift the wheel off the roadway. This leads to heating of the ambient air, heating of the wheel, reduced traction on the road, and moisture condensation due to the air being compressed ahead of the contact patch. At extreme speeds, the heated compressed air can float the wheel out of contact with the roadway.

SUMMARY OF THE INVENTION

It is an object of the present invention to improve the air flow immediately before the contact patch of a rotating wheel so as to control wheel temperature, improve friction, enable faster acceleration, deceleration and higher speeds of the vehicle, and provide for improved control of the vehicle.

In the present invention, an air or gas jet is applied immediately before the contact patch under the forward portion of a wheel so as to remove air in front of the contact patch under the wheel and reduce the wheel lift and to improve the tire friction and to reduce heating of the tire. In this specification "air jet" is to be understood to mean "gas jet" and the gaseous medium may consist of a number of substances. The gas jet may also not be applied full time, but only when there is acceleration, deceleration, cornering or skidding, for example.

It is an object of the present invention to provide an air jet transverse to the plane of the wheel so that such air jet reduces the air in front of the contact patch and before the contact patch so as to increase friction and to reduce heating of the tire.

The air jet of the present invention may be directed transversely and somewhat forwardly or backwardly so that the ambient air moving toward the contact patch will be directed transversely away from the plane of the wheel and, thus reduce wheel lift, increase tire friction and reduce tire heating.

It is another object of the invention to provide for heating the gas jet ahead of the contact patch of the wheel so as to improve traction and minimize condensation of the moist ambient air when compressed ahead of the contact patch.

It is another object to provide one or more air ducts with inlets facing in the forward direction of travel and with outlets facing perpendicular to the direction of travel of the vehicle and in front of the tire near the contact patch so as to reduce the pressure ahead of and at the contact patch so as to decrease wheel lift and minimization of condensation so as to increase traction.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view illustrating the invention;

FIG. 2 is a top plan view illustrating the invention;

FIG. 3 is a top plan view illustrating the invention;

FIG. 4 is a top plan view of the invention illustrating the air jet nozzle pointed in a direction somewhat ahead of perpendicular to the direction of movement of the wheel;

DETAILED DESCRIPTION OF THE PREFERRED EMBODIMENTS

Figure 5:
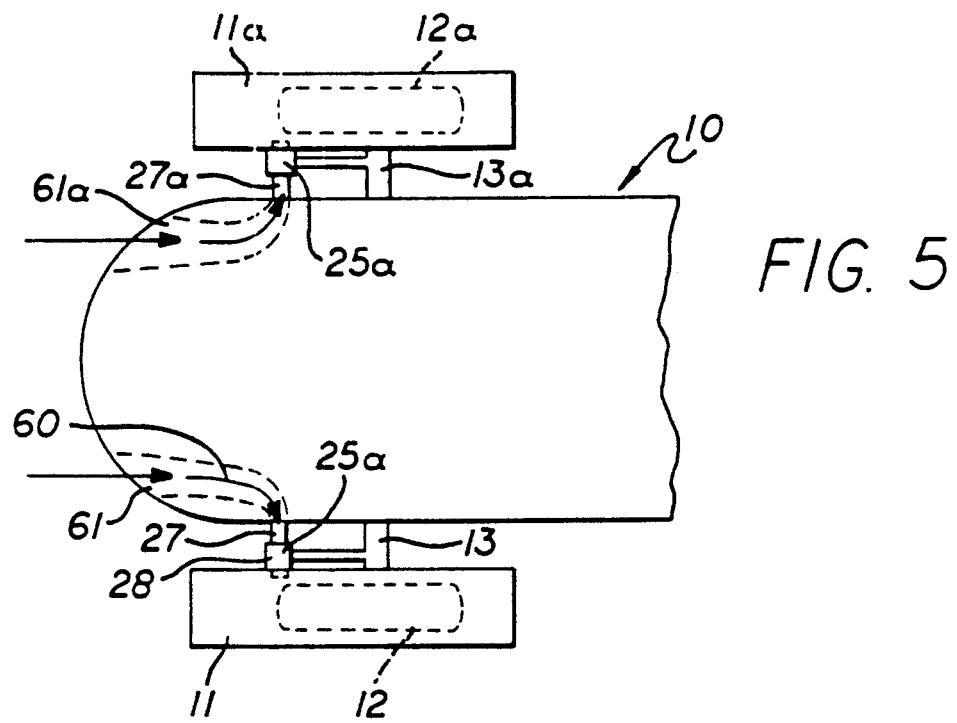
FIG. 5 is a top plan view illustrating air ducts supplying air to air nozzles to the region ahead of the contact patches.

As shown in FIGS. 1-6 as the vehicle moves, ambient air is forced between the tire and the road surface (the contact patch). In the present invention, high velocity air is used to divert the oncoming air as seen in FIGS. 1-6.

The high velocity air or air jet should have a horizontal component which substantially is perpendicular to the direction of travel of the vehicle. The velocity of the air jet is sufficient relative to the forward speed of the vehicle such that at least a portion of the parcels of air leaving the jet and being deflected by the oncoming air flow will have traversed to the edge of the tire before the tire in its forward direction could contact the parcel.

In this manner, high pressure in the triangulated area bounded by the air jet flow, the tire and the road surface (which herein is called the area "in front of and adjacent to the contact patch") will be reduced.

FIG. 1 is a side view of a vehicle 10 which has a wheel 12 mounted on an axle 13 and has a wheel skirt or fender 11. As shown in top plan views 2-6 an arm 31 extends from the axle 13 inwardly of the wheel 12 and supports an air nozzle 25 that is held by a nozzle holder 28 and which has an output orifice 40 so as to create an air stream or jet which moves perpendicular to the direction of travel of the wheel 12. A structural member 14 of the vehicle 10 supports an air duct 24 which is connected by a collar 26 to the member 14 and the member 14 is formed with an opening through which the air duct 24 communicates with an air duct 27 that is connected to the nozzle holder 28 which supports the air nozzle 25.

As shown in FIG. 2, the conduit 24 is connected to a compressor 23 for supplying pressurized gas to the conduit 24. The compressor 23 is driven by a motor 21 through the shaft 22. The motor 21 is controlled by a controller 71 which adjusts the compressor pressure or output 23. The adjustment could be automatic. An air pressure gauge 73 is mounted in the conduit 24 so as to monitor the pressure therein.

As seen in FIG. 1 and FIG. 2, the air jet from opening 40 of the nozzle 25 provides a horizontal air jet perpendicular to the direction of travel of the vehicle under the front portion of the tire between the ground 15 and the lower front portion of the tire. The perpendicular air jet 80 from the nozzle 25 engages the oncoming air flow 29 which results from forward motion of the vehicle and deflects it from the triangular area immediately in front of the contact patch so that the pressure in the triangular region A is reduced thus reducing the upwardly directed lift on the wheel 12 so as to increase the friction, decrease condensation and to reduce the heating of the air ahead of the wheel.

FIG. 2 is a top plan view showing the ambient air flow 29 which is opposite to the direction of movement B of the vehicle and illustrates the air jet 80 perpendicular to the direction of travel B.

FIG. 3 illustrates the resultant air flow 81 from a combination of the ambient air 29 and the air jet 80 and it is seen that this provides a generally curved resultant motion of the air in the region A ahead of the contact patch 20.

FIG. 4 illustrates a modification of the invention wherein the nozzle 25 is mounted so that the air jet 80 travels in a position slightly forward of perpendicular to the direction of travel B. The result is that the resultant air in the region A ahead of the contact patch 20 will move substantially perpendicular to the direction of travel of the wheel due to the combination of the oncoming air flow 29 and the air jet 80 thus effectively reducing the air pressure before the wheel in the region A. The amount of rotation of the nozzle 25 in the forward direction can be adjusted as a function of the vehicle speed if desired by moving it relative to the supporting arm 31. Also, the velocity and volume of the existing air can be adjusted by the controller 71. The controller 71 may control the jet stream so that the jet is intermittently applied to the front of the wheel. The intermittent application of the jet may be beneficial in improving wheel to surface traction.

As to the position of the air jet, it could point transversely to the wheel as shown in FIG. 2 or forwardly as shown in FIG. 4 or the nozzle could be mounted somewhat ahead of the wheel and be pointed somewhat rearwardly. With a higher jet speed, the same exiting gas (particularly on narrower tires) would reach the edge of the tire in sufficient time to remove the high pressure build-up.

Thus, the controlling factor is to produce a vector component of exiting gas that is parallel to the load bearing surface, and perpendicular to the direction of travel which has sufficient exit velocity to reach the edge of the tire.

FIG. 5 is a top plan view illustrating forwardly extending ducts 61 and 61a with inlets at the forward portions 60 of the vehicle 10 and which communicate with the conduits 27, 27a. respectively, so as to supply air to the nozzles 25 and 25a. Thus, the oncoming air enters the ducts 61 and 61a and is turned 90° so as to be discharged ahead of the contact patches under the wheels 12 and 12a.

Figure 6:
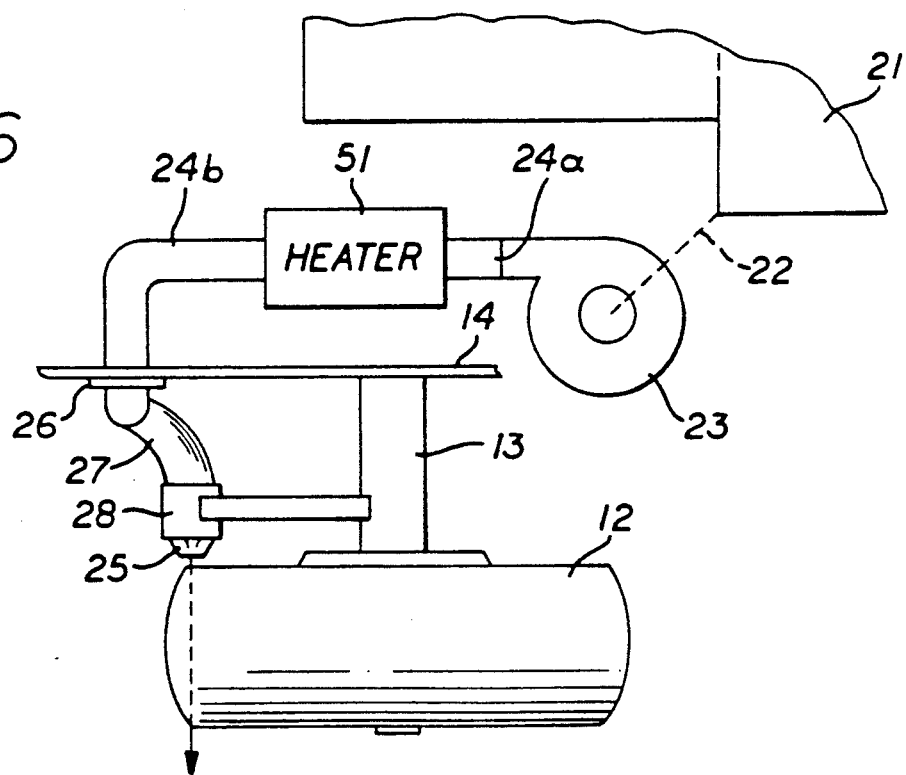
FIG. 6 is a top partially schematic view of a modification of the invention.

FIG. 6 illustrates a modified form of the invention in which a heater 51 is mounted between the blower 23 and the conduit 27. This heater may be the engine itself. For example, a water cooled engine may use cooling water to heat the air. A first conduit 24a extends from the blower 23 to the heater 51 and a second conduit 24b extends from the output of the heater 51 to the conduit 27. Thus, the invention heats the high speed air that is injected more or less perpendicular to the direction of travel of the vehicle in front of the contact patch. Normally, as the deflecting air stream under pressure is released, it will cool. Thus, redirected air which is not heated with a heat source will be cooler than the ambient air which will have the following effects.

(a) The air will settle on the road surface because it is denser than the ambient air.

(b) Cold air is dense air and could increase the pressure at the contact patch beyond what would be present if the air is heated.

(c) The cold air in combination with saturated ambient air under pressure will cause condensation which will reduce vehicle traction.

By heating the gas before it is released under the tire so it exists at a higher temperature than the ambient air;

1) the pressure and velocity of the deflecting air stream can be increased;

2) the deflecting air stream and the air that is being deflected will rise away from the road surface further reducing the air pressure at the contact patch, 3) the possibility of condensation at the contact patch will be decreased or eliminated because the warmer gas has a lower relative humidity, and 4) if the air is sufficiently hot, any ice or condensation on the road surface could be evaporated by the combination of heat and lower pressure at the contact path.

Thus, the heater 51 results in a substantial improvement in the invention.

Figure 7A:
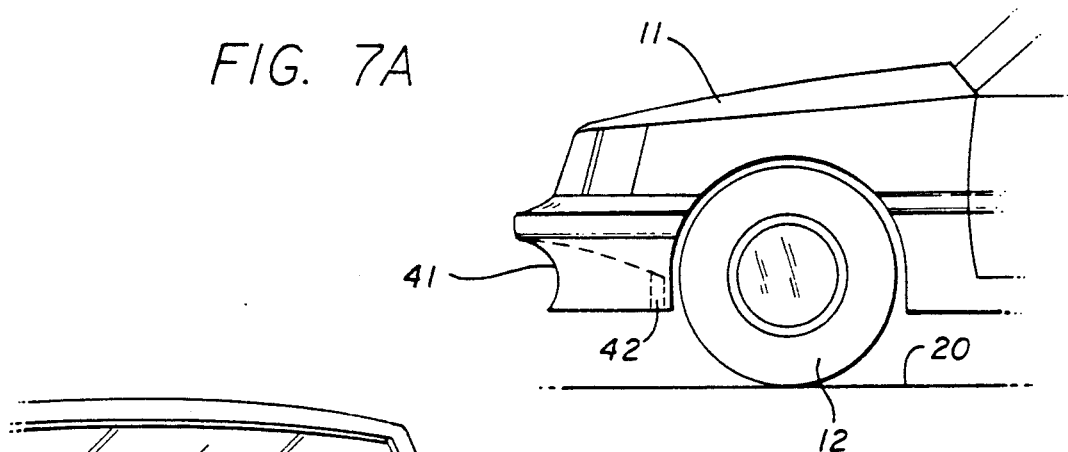
FIGS. 7A, 7B and 7C are views of a spoiler incorporating the invention.
Figure 7B:
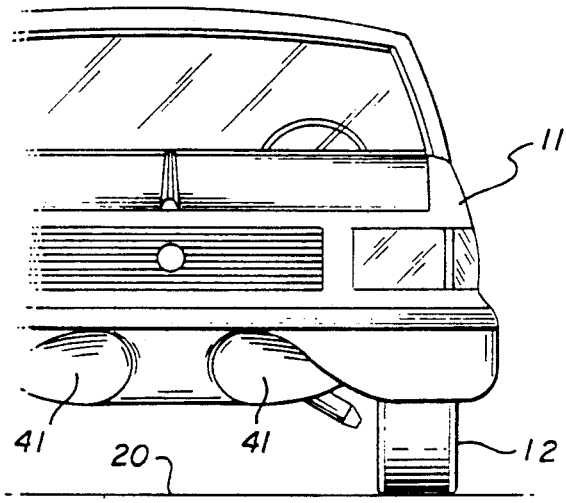
Figure 7C:
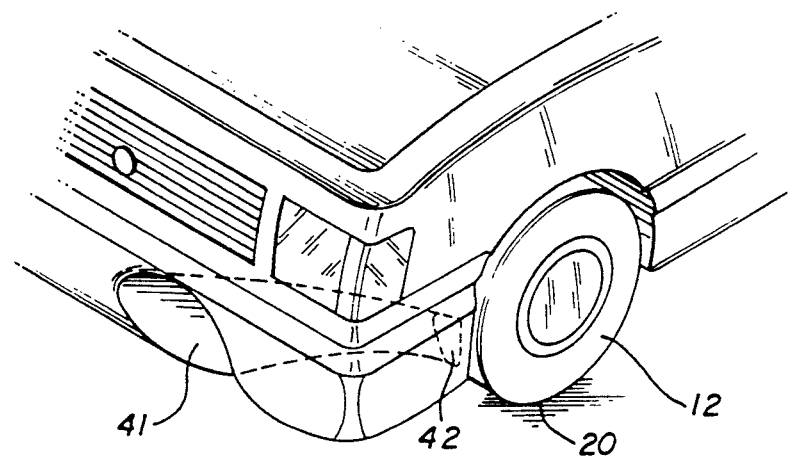

FIGS. 7A, 7B and 7C show a modification which has a spoiler.

It is to be understood that the spoiler can be applied to both the front and rear wheels in the case of a vehicle.

The perpendicular air jet does not have to be totally effective in displacing ambient air. Therefore, the air jet may not need to be able to displace ambient air either in its entirety, or completely to the edge of the wheel. Any partial displacement of ambient air will improve traction, decrease heat, and decrease condensation.

These same principles could be applied to any rotating wheel in contact with a surface when there is no relative velocity differential at the contact patch. It need not, for example be a vehicle. For example, it would apply to a fixed rotating wheel in contact with a moving surface, such as a conveyor belt. It could apply to airplane wheels.

The shape of the gas jet at its output is irrelevant. It could be circular, a thin vertical screen, as shown or dynamically contoured.

FIGS. 7A, 7B and 7C show a vehicle with a spoiler 41 which, with regard to the front wheels 12, could be a curved open duct which extends from the frame of the vehicle 11 to a closed or open duct 42 which emits the gas jet to the wheel 12 near the contact patch 20. As shown in FIG. 7B, a duct 41 may extend to each of the wheels.

Although the duct is shown directing the gas jet to the front wheels, it may also direct the gas jet to the rear wheels.

Thus, the invention uses a substantially transverse air jet to reduce the air pressure in the region immediately ahead of the contact patch between the roadway and the curved portion of the wheel.

In this specification and drawings at times the word "duct" is used. It is to be understood that this includes closed tubes as well as open ducts which deflect gases.

It is further understood that the method of holding the gas jet in proximity to the contact patch is not a subject of this invention. For example, it could ride on the road surface, or be floating at a fixed position above the road. Nor is the heat source, gas type or compressor type relevant.

Although it is the purpose of the invention to use a gas jet to reduce air pressure under the wheel ahead of the contact patch, it will necessarily follow that any water, snow, dust or other material ahead of the contact patch may also be eliminated (note: melted/blown away).

Although the invention has been described with respect to preferred embodiments, it is not to be so limited as changes and modifications can be made which are within the full intended scope of the invention as defined by the appended claims.

I claim as our invention:

1. In a device having a rotating wheel which rotates about a spin axis and is adapted to contact a surface at the contact patch such that the wheel at the contact patch and the surface at the contact patch have the same velocity, means for supplying a gas jet in a direction that is essentially parallel with the spin axis at a location which is ahead of the contact patch.

2. The device of claim 1 wherein said means for supplying a gas jet has an output nozzle which is directed forwardly of a line which is perpendicular to said wheel.

3. The device of claim 1 wherein said means for supplying a gas jet includes a heater for heating said gas jet.

4. The device of claim 1 wherein said means for supplying a gas jet includes a gas compressor.

5. The device of claim 4 wherein said gas compressor includes a motor.

6. The device of claim 4 wherein said gas compressor comprises a compressed gas cylinder.

7. The device of claim 1 or 4 or 5 or 6 including a controller so as to vary the output of said gas jet.

8. The device of claim 7 including a pressure gauge mounted so as to monitor the output.

9. The device of claim 1 wherein said means for supplying a gas jet includes an input duct for receiving air therein and connected to an output duct for supplying said gas jet.

10. The device of claim 9 wherein said input duct is generally directed in the forward direction of the vehicle.

11. The method of increasing traction of a wheel which rotates about a spin axis and contacts a load bearing surface at a contact patch comprising, the step of directing a gas jet ahead of the contact patch under said wheel in a direction that is essentially parallel with the spin axis at a location ahead of the contact patch.

12. The method of claim 11 wherein said gas jet is directed in a direction which is ahead of perpendicular to the plane of said wheel.

13. The method of claims 11 or 12 including the additional step of heating the gas before supplying said gas jet.

14. The device of claims 1 or 4 or 5 or 6 wherein said means for supplying a gas jet applies said gas jet intermittently.

15. The device of claim 1 wherein a perpendicular component of the gas jet is sufficient so as to reach the edge of the wheel.

16. The device of claim 1 wherein said means for supplying a gas jet is a spoiler.

17. The method of claim 11 further comprising the step of moving the location of the gas jet.

18. The method of claim 11 wherein a spoiler directs said gas jet.

* * * * *

UNITED STATES PATENT AND TRADEMARK OFFICE
CERTIFICATE OF CORRECTION

PATENT NO. : 5,301,996
DATED : April 12, 1994
INVENTOR(S) : THEIS

It is certified that error appears in the above-indentified patent and that said Letters Patent is hereby corrected as shown below:

On the title page: Item [54] and Column 1. line 3, change "ATA" to -- AT A --.

Signed and Sealed this

Eighth Day of August, 1995

Attest:

BRUCE LEHMAN

*Attesting Officer*     *Commissioner of Patents and Trademarks*